(12) United States Patent
Li et al.

(10) Patent No.: US 12,024,460 B2
(45) Date of Patent: Jul. 2, 2024

(54) FEEDING SYSTEM AND GLASS PRODUCTION APPARATUS HAVING SAME

(71) Applicants: TUNGHSU TECHNOLOGY GROUP CO., LTD., Beijing (CN); TUNGHSU GROUP CO., LTD., Hebei (CN); SHIJIAZHUANG XUXIN OPTOELECTRONIC TECHNOLOGY CO., LTD., Hebei (CN)

(72) Inventors: Qing Li, Hebei (CN); Heran Li, Hebei (CN); Yanchao Guo, Hebei (CN); Xiaobin Yang, Hebei (CN); Quan Zheng, Hebei (CN); Litao Jin, Hebei (CN); Wei Li, Hebei (CN); Bing Zhang, Hebei (CN)

(73) Assignees: TUNGHSU TECHNOLOGY GROUP CO., LTD., Beijing (CN); TUNGHSU GROUP CO., LTD., Hebei (CN); SHIJIAZHUANG XUXIN OPTOELECTRONIC TECHNOLOGY CO., LTD., Hebei (CN)

( * ) Notice: Subject to any disclaimer, the term of this patent is extended or adjusted under 35 U.S.C. 154(b) by 548 days.

(21) Appl. No.: 17/442,472

(22) PCT Filed: May 16, 2019

(86) PCT No.: PCT/CN2019/087240
§ 371 (c)(1),
(2) Date: Sep. 23, 2021

(87) PCT Pub. No.: WO2020/191898
PCT Pub. Date: Oct. 1, 2020

(65) Prior Publication Data
US 2022/0162109 A1    May 26, 2022

(30) Foreign Application Priority Data

Mar. 25, 2019  (CN) .......................... 201910228876.4

(51) Int. Cl.
*C03B 3/02* (2006.01)
*B01F 35/00* (2022.01)
(Continued)

(52) U.S. Cl.
CPC .............. *C03B 3/02* (2013.01); *B01F 35/184* (2022.01); *B01F 35/718* (2022.01);
(Continued)

(58) Field of Classification Search
CPC .... B01F 35/718; B01F 2035/35; F16L 23/003
See application file for complete search history.

(56) References Cited

U.S. PATENT DOCUMENTS

| 3,794,475 | A | * | 2/1974 | Lazet et al. | ........... | C03B 37/005 |
| | | | | | | 65/525 |
| 2017/0291779 | A1 | * | 10/2017 | Lucas | .................... | B01D 45/16 |

FOREIGN PATENT DOCUMENTS

| CN | 101333061 A | 12/2008 |
| CN | 202912190 U | 5/2013 |

(Continued)

OTHER PUBLICATIONS

First Search for Patent Appl. No. CN201910228876.4 mail date Jul. 29, 2019, 1 page.
(Continued)

*Primary Examiner* — Cynthia Szewczyk
(74) *Attorney, Agent, or Firm* — Maine Cernota & Curran

(57) ABSTRACT

The present invention discloses a feeding system that comprises a plurality of material tanks having air outlets, a plurality of blowers, a dust remover having an air inlet, and a connecting pipe. Air inlets of the plurality of blowers are
(Continued)

in communication with the air outlets of the material tanks in one-to-one correspondence. The first end of the connecting pipe is in communication with the air inlet of the dust remover, and the second end of the connecting pipe is movable between being connected with the air outlet of a first one of the plurality of blowers and being connected with the air outlet of a second one of the plurality of blowers. The disclosed feeding system has a simple structure and zero dust leakage. Also disclosed is a glass production apparatus that comprises the disclosed feeding system.

19 Claims, 4 Drawing Sheets

(51) Int. Cl.
  *B01F 35/71* (2022.01)
  *B65G 69/18* (2006.01)
  *F16L 23/00* (2006.01)
  *B01F 35/30* (2022.01)

(52) U.S. Cl.
  CPC ......... *B65G 69/182* (2013.01); *B65G 69/183* (2013.01); *F16L 23/003* (2013.01); *B01F 2035/351* (2022.01)

(56) References Cited

FOREIGN PATENT DOCUMENTS

| | | | | |
|---|---|---|---|---|
| CN | 203682018 U | 7/2014 | | |
| CN | 205109265 U | 3/2016 | | |
| CN | 205347187 U | 6/2016 | | |
| CN | 206735278 U | 12/2017 | | |
| CN | 108274616 A | 7/2018 | | |
| CN | 108714397 A | * 10/2018 | ............ | B01F 13/002 |
| DE | 1965169 A1 | 12/1996 | | |
| JP | 08285990 A | 11/1996 | | |
| JP | H11128780 A | 10/1997 | | |
| JP | 2005154165 A | 6/2005 | | |
| JP | 2015163580 A | 9/2015 | | |
| KR | 20010056265 A | 12/1999 | | |

OTHER PUBLICATIONS

First Office Action for Patent Appl. No. CN201910228876.4 mail date Aug. 5, 2019, 7 pages.
Second Office Action for Patent Appl. No. CN201910228876.4 mail date Sep. 25, 2019, 12 pages.
Supplementary Search for Patent Appl. No. CN201910228876.4 mail date Dec. 5, 2019, 1 page.
Notification to Grant Patent Right for Invention for Patent Appl. No. CN20190228876.4 mail date Dec. 17, 2019, 3 pages.
International Preliminary Report on Patentability for PCT Appl. No. PCT/CN2019/087240 mail date Oct. 7, 2021, 5 pages.
Extended European Search Report for Patent Appl. No. EP19921915.5 mail date Apr. 7, 2022, 6 pages.
International Search Report and English Translation for PCT/CN2019/087240 dated Dec. 24, 2019, 6 Pages.

* cited by examiner

FEEDING SYSTEM AND GLASS PRODUCTION APPARATUS HAVING SAME

RELATED APPLICATIONS

The present application is a national phase application filed under 35 USC § 371 of PCT Application No. PCT/CN2019/087240, with an international filing date of May 16, 2019, which claims priority to the Chinese Patent Application No. 201910228876.4, filed on Mar. 25, 2019. Both of these applications are herein incorporated by reference in their entirety for all purposes.

FIELD

The present invention relates to a feeding system and a glass production apparatus having the feeding system.

BACKGROUND

In the glass manufacturing industry and other industries, a large quantity of various powdered raw materials are loaded into multiple material tanks according to the production formula, and then the powdered raw materials in the material tanks are fed into a mixing tank in specified proportions. In order to prevent unsmooth material loading or even back splashing incurred by air flow disturbance in a material tank when the powdered raw material is loaded into the material tank, a blower mounted on the material tank may be utilized to discharge air outwards, so as to maintain a negative pressure in the material tank.

However, the air discharged by the blower contains a large amount of dust, and the working environment and the physical health of the workers will be severely harmed if the dust-containing air is discharged into the blending room.

SUMMARY

To solve the problems in the prior art, the present invention provides a feeding system and a glass production apparatus having the feeding system.

In order to attain the above object, in a first aspect, the present invention provides a feeding system, which comprises: a plurality of material tanks, each of which has an air outlet; a plurality of blowers, having air inlets in communication with air outlets of the material tanks in one-to-one correspondence; a dust remover, having an air inlet; and a connecting pipe, having a first end in communication with the air inlet of the dust remover and a second end movably arranged between a first connection position and a second connection position, wherein, at the first connection position, the second end is connected with the air outlet of one of the plurality of blowers; at the second connection position, the second end is connected with the air outlet of another one of the plurality of blowers.

The feeding system according to the embodiments of the present invention has the advantages of simple structure and zero dust leakage.

Preferably, the connecting pipe comprises: a first connecting section, having a first end in communication with the air inlet of the dust remover; a telescopic section arranged telescopically, having a first end connected with a second end of the first connecting section; and a second connecting section, having a first end connected with a second end of the telescopic section and a second end movably arranged between the first connection position and the second connection position, wherein, at the first connection position, the second end of the second connecting section is connected with the air outlet of one of the plurality of blowers; at the second connection position, the second end of the second connecting section is connected with the air outlet of another one of the plurality of blowers.

Preferably, the first connecting section comprises: a first connecting subsection arranged vertically, having a first end connected with the air inlet of the dust remover; a second connecting subsection, having a second end connected with the first end of the telescopic section and a first end vertically arranged and rotatably connected with the second end of the first connecting subsection, wherein the rotation axis of the first end of the second connecting subsection extends in the vertical direction; preferably the second connecting subsection is an elbow, more preferably the second connecting subsection is a 90-degree elbow; preferably the first end of the second connecting subsection is provided with a first flange, the second end of the first connecting subsection is provided with a second flange, a first gasket is provided between the first flange and the second flange, the connecting pipe further comprises a lock cap sleeved on the first flange and the second flange, and a second gasket is provided between the lock cap and the first flange, wherein the lock cap comprises a first sub-cap and a second sub-cap, which are connected with each other by fasteners.

Preferably, the telescopic section comprises: a first subsection arranged horizontally, having a first end connected with the second end of the first connecting section; and a second subsection arranged horizontally, having a second end connected with the first end of the second connecting section and a first end rotatably connected with the second end of the first subsection with respect to the second end of the first subsection, wherein the rotation axis of the first end of the second subsection extends in the vertical direction.

Preferably, the telescopic section further comprises a third connecting subsection having a first end connected with the second end of the first subsection and a second end vertically arranged; and a fourth connecting subsection having a first end vertically arranged and rotatably connected with the second end of the third connecting subsection with respect to the second end of the third connecting subsection and a second end connected with the first end of the second connecting subsection, wherein the rotation axis of the first end of the fourth connecting subsection extends in the vertical direction; preferably each of the third connecting subsection and the fourth connecting subsection is an elbow, more preferably each of the third connecting subsection and the fourth connecting subsection is a 90-degree elbow; preferably the first end of the fourth connecting subsection is provided with a first flange, the second end of the third connecting subsection is provided with a second flange, a first gasket is provided between the first flange and the second flange, the connecting pipe further comprises a lock cap sleeved on the first flange and the second flange, and a second gasket is provided between the lock cap and at least one of the first flange and the second flange, wherein the lock cap comprises a first sub-cap and a second sub-cap, which are connected with each other by fasteners.

Preferably the second connecting section is rotatably arranged, and the rotation axis of the second connecting section extends in the horizontal direction; preferably the first end of the second connecting section is rotatably connected with the second end of the telescopic section, and the rotation axis of the first end of the second connecting section extends in the horizontal direction; preferably the first end of the second connecting section is provided with a first flange, the second end of the telescopic section is provided with a second flange, a first gasket is provided between the first flange and the second flange, the connecting pipe further comprises a lock cap sleeved on the first flange and the second flange, and a second gasket is provided between the lock cap and the first flange, wherein the lock cap comprises a first sub-cap and a second sub-cap, which are connected with each other by fasteners.

Preferably the second connecting section comprises a fifth connecting subsection having a first end connected with the second end of the telescopic section and a second end arranged vertically; and a sixth connecting subsection having a first end vertically arranged and rotatably connected with the second end of the fifth connecting subsection and a second end movably arranged between the first connection position and the second connection position, wherein the rotation axis of the first end of the sixth connecting subsection extends in the vertical direction; preferably each of the fifth connecting subsection and the sixth connecting subsection is an elbow, more preferably each of the fifth connecting subsection and the sixth connecting subsection is a 90-degree elbow; preferably the first end of the sixth connecting subsection is provided with a first flange, the second end of the fifth connecting subsection is provided with a second flange, a first gasket is provided between the first flange and the second flange, the connecting pipe further comprises a lock cap sleeved on the first flange and the second flange, and a second gasket is provided between the lock cap and the first flange, wherein the lock cap comprises a first sub-cap and a second sub-cap, which are connected with each other by fasteners.

Preferably the second end of the connecting pipe is arranged horizontally, and a volute casing of each of the plurality of blowers has an air discharge portion arranged horizontally, which has a free end defining the air outlet of the blower, wherein, at the first connection position, the second end is connected with the free end of one of the plurality of blowers; at the second connection position, the second end is connected with the free end of another one of the plurality of blowers.

Preferably the second end of the connecting pipe is provided with a third flange, the air discharge portion is provided with a fourth flange, and the connecting pipe further comprises a connecting shackle, which comprises: a manipulating portion hinged to the second end of the connecting pipe; and a hook portion having a first end connected with the manipulating portion, wherein, when the second end of the connecting pipe is at the first connection position or the second connection position, the third flange is fitted with the fourth flange on the corresponding blower, and the second end of the hook portion hooks the fourth flange, so as to press the fourth flange on the third flange.

In a second aspect, the present invention provides a glass production apparatus, which comprises: the feeding system according to the first aspect of the present invention; a mixing tank, having a feed inlet in communication with a discharge outlet of each of the material tanks of the feeding system; and a kiln, having a feed inlet in communication with a discharge outlet of the mixing tank.

The glass production apparatus according to the embodiments of the present invention has the advantages of simple structure and zero dust leakage.

DETAILED DESCRIPTION

Figure 1:
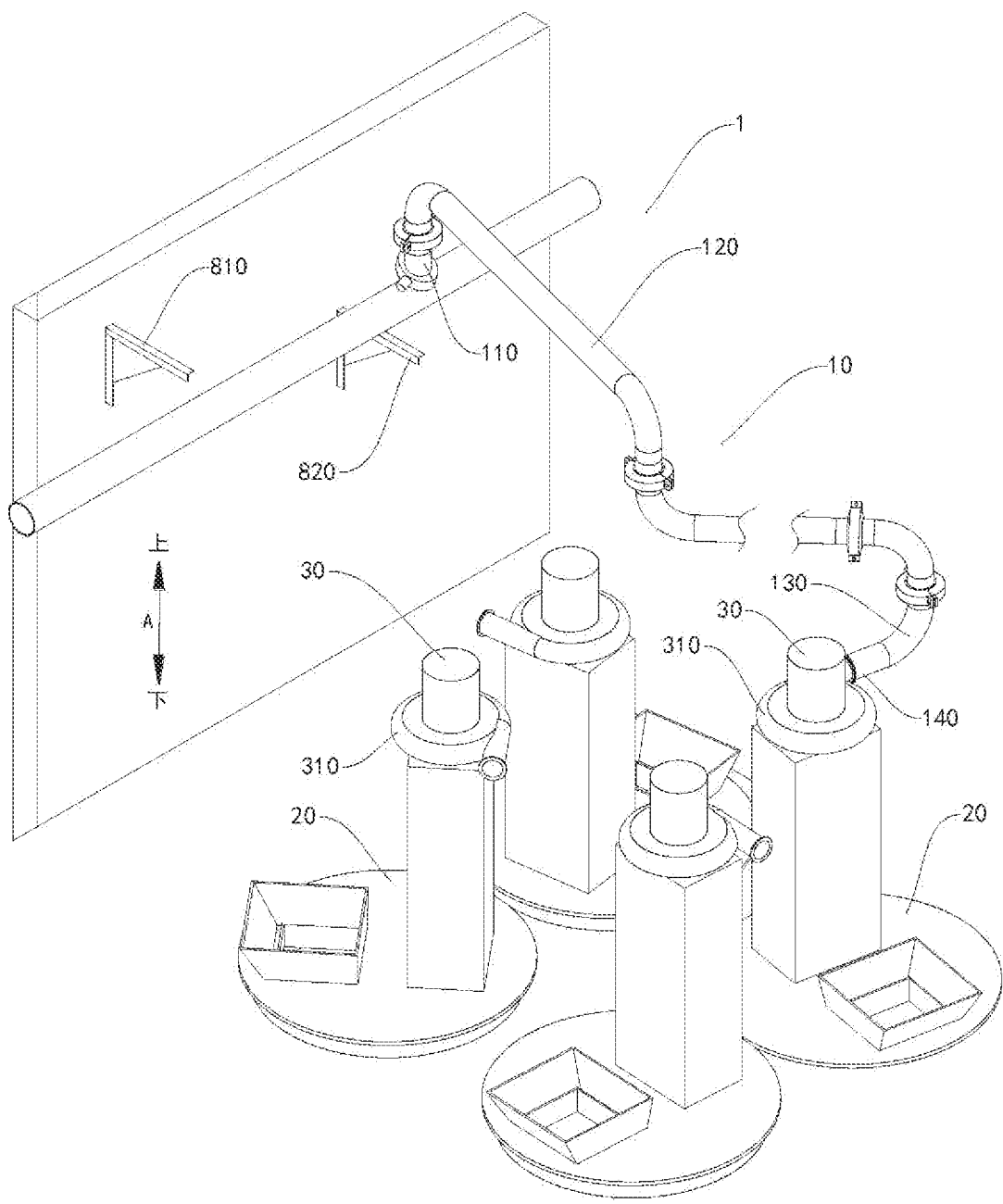
FIG. 1 is a schematic structural diagram of the feeding system according to an embodiment of the present invention.

Hereunder some embodiments of the present invention will be detailed, and examples of the embodiments are shown in the accompanying drawings. It should be noted that the embodiments described with reference to the accompanying drawings are only exemplary and are provided only to explain the present invention rather than constituting any limitation to the present invention.

Hereunder the feeding system 1 according to an embodiment of the present invention will be described with reference to the accompanying drawings. As shown in FIGS. 1-5, the feeding system 1 according to an embodiment of the present invention comprises a plurality of material tanks 20, a plurality of blowers 30, a dust remover and a connecting pipe 10.

Each material tank 20 has an air outlet, and the dust remover has an air inlet. The air inlets of the plurality of blowers 30 are in communication with the air outlets of the material tanks 20 in one-to-one correspondence. That is to say, the number of the blowers 30 may be equal to the number of the material tanks 20, and the air inlet of each blower 30 is in communication with the air outlet of one material tank 20.

The first end of the connecting pipe 10 is in communication with the air inlet of the dust remover, and the second end 140 of the connecting pipe 10 is movably arranged between a first connection position and a second connection position, wherein, at the first connection position, the second end 140 of the connecting pipe 10 is connected with the air outlet 312 of one of the plurality of blowers 30; at the second connection position, the second end 140 of the connecting pipe 10 is connected with the air outlet 312 of another one of the plurality of blowers 30. In other words, the second end 140 of the connecting pipe 10 is switchably connected to any one of the plurality of blowers 30.

The working process of the feeding system 1 according to the embodiment of the present invention will be briefly described below with reference to FIGS. 1-5. Before the powdered raw material is loaded into a material tank 20, the second end 140 of the connecting pipe 10 is connected to the air outlet 312 of the blower 30 in communication with the air outlet of the material tank 20 first. When the powdered raw material is loaded into the material tank 20, the blower 30 is started to maintain a negative pressure in the material tank 20. In view that the air discharged by the blower 30 contains a large amount of dust, it may be discharged through the connecting pipe 10 into the dust remover.

After the powdered raw material is loaded into the material tank 20, the second end 140 of the connecting pipe 10 may be connected to the air outlet 312 of the blower 30 in communication with the air outlet of another material tank 20 before the powdered raw material is loaded to said another material tank 20. When the powdered raw material is loaded into said another material tank 20, the blower 30 is started to maintain a negative pressure in said another material tank 20. In view that the air discharged by the blower 30 contains a large amount of dust, it may be discharged through the connecting pipe 10 into the dust remover.

That is to say, whenever the powdered raw material is to be loaded into a material tank 20, the second end 140 of the connecting pipe 10 is connected to the air outlet 312 of the blower 30 in communication with the air outlet of the material tank 20, so that the dust-containing air discharged by the blower 30 can enter the dust remover through the connecting pipe 10. Thus, the connecting pipe 10 may cooperate with a plurality of material tanks 20 and a plurality of blowers 30, so that a plurality of blowers 30 can share the same connecting pipe 10.

Thus, the structure of the feeding system 1 can be simplified, i.e., it is unnecessary to provide a separate connecting pipe 10 connected to the dust remover for each blower 30. Therefore, even if the working space (blending room) of the feeding system 1 is narrow, the blower 30 that will discharge dust-containing air can be connected with the connecting pipe 10, so as to avoid discharging the dust into the blending room. That is to say, the space occupied by the feeding system 1 can be reduced.

In the feeding system 1 according to the embodiment of the present invention, by arranging the second end 140 of the connecting pipe 10 movably between the first connection position and the second connection position, a plurality of blowers 30 can share the connecting pipe 10, so that the dust-containing air discharged by the blowers 30 can enter the dust remover through the connecting pipe 10.

Therefore, the feeding system 1 according to the embodiment of the present invention has the advantages of simple structure and zero dust leakage, etc.

As shown in FIGS. 1-5, in some embodiments of the present invention, the feeding system 1 comprises material tanks 20, blowers 30, a connecting pipe 10 and the dust remover. The connecting pipe 10 comprises a first connecting section 110, a telescopic section 120 and a second connecting section 130.

The first end of the first connecting section 110 is in communication with the air inlet of the dust remover. The telescopic section 120 is arranged telescopically, and the first end of the telescopic section 120 is connected with the second end of the first connecting section 110. The first end 131 of the second connecting section 130 is connected with the second end 125 of the telescopic section 120, and the second end of the second connecting section 130 is movably arranged between the first connection position and the second connection position, wherein, at the first connection position, the second end 134 of the second connecting section 130 is connected with the air outlet 312 of one of the plurality of blowers 30; at the second connection position, the second end 134 of the second connecting section 130 is connected with the air outlet 312 of another one of the plurality of blowers 30.

Since the connecting pipe 10 includes the telescopic section 120, the connecting pipe 10 is also arranged telescopically. Thus, the second end 140 of the connecting pipe 10 can be connected more conveniently and easily with the blowers 30 at different distances from the dust remover, so that more blowers 30 can share the connecting pipe 10, thereby the structure of the feeding system 1 is further simplified and the space occupied by the feeding system 1 is further reduced.

Figure 2:
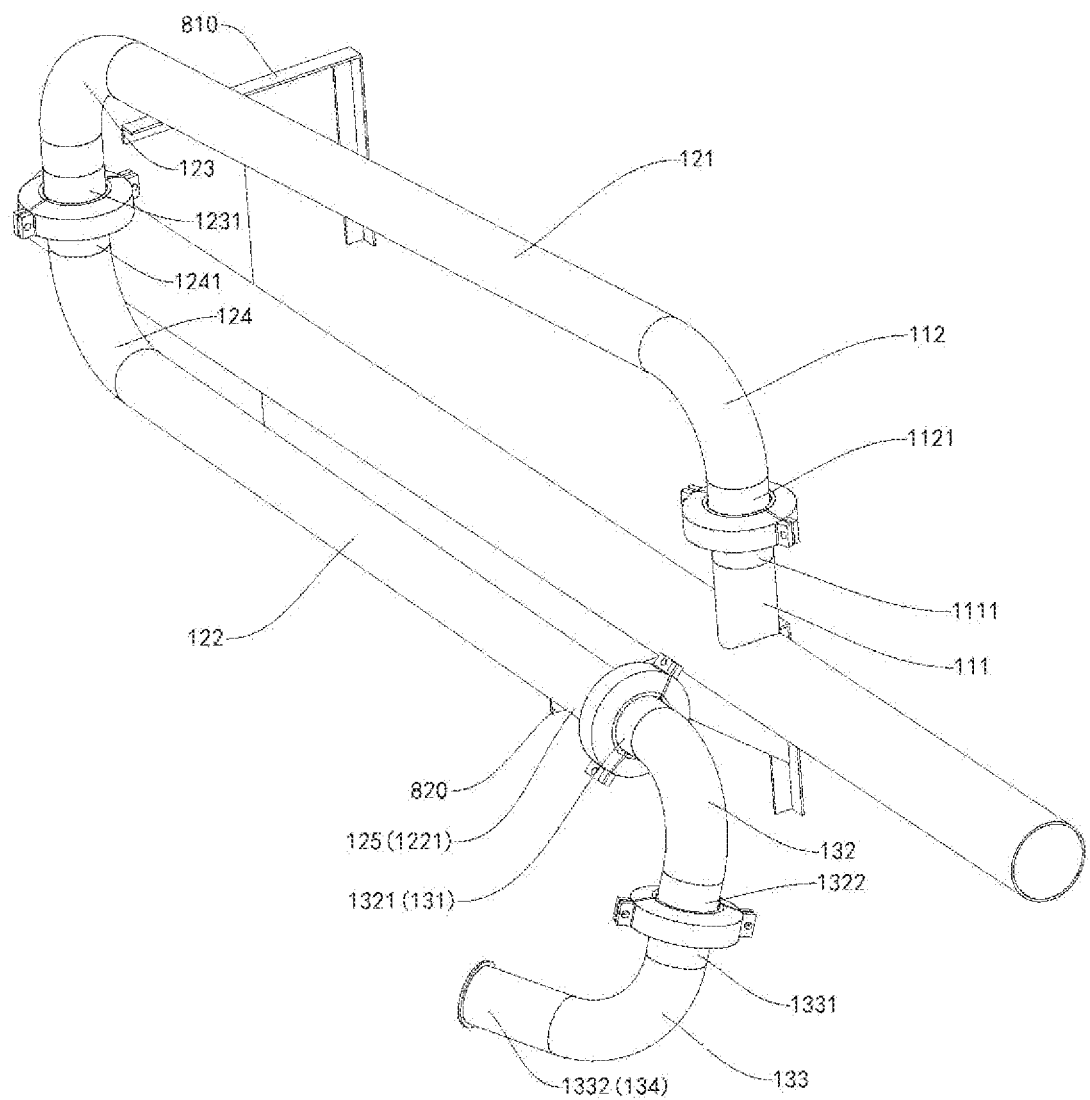
FIG. 2 is a partial schematic structural diagram of the feeding system according to an embodiment of the present invention.

As shown in FIGS. 1 and 2, the first connecting section 110 may comprise a first connecting subsection 111 and a second connecting subsection 112. The first connecting subsection 111 is arranged vertically, which is to say, the first connecting subsection 111 may extend in the vertical direction, and the first end of the first connecting subsection 111 is connected with the air inlet of the dust remover. The second end of the second connecting subsection 112 is connected with the first end of the telescopic section 120.

The first end 1121 of the second connecting subsection 112 is arranged vertically, which is say, the first end 1121 of the second connecting subsection 112 may extend in the vertical direction. The first end 1121 of the second connecting subsection 112 is rotatably connected with the second end 111 of the first connecting subsection 111, and the rotation axis of the first end 1121 of the second connecting subsection 112 extends in the vertical direction.

Thus, the second connecting subsection 112 can drive the telescopic section 120 to rotate around the rotation axis of the first end 1121 of the second connecting subsection 112, so as to further expand the scope of movement of the telescopic section 120 and the connecting pipe 10. Thus, the second end 140 of the connecting pipe 10 can be connected more conveniently and easily with the blowers 30 at different distances from the dust remover, so that more blowers 30 can share the connecting pipe 10, thereby the structure of the feeding system 1 is further simplified and the space occupied by the feeding system 1 is further reduced.

Figure 3:
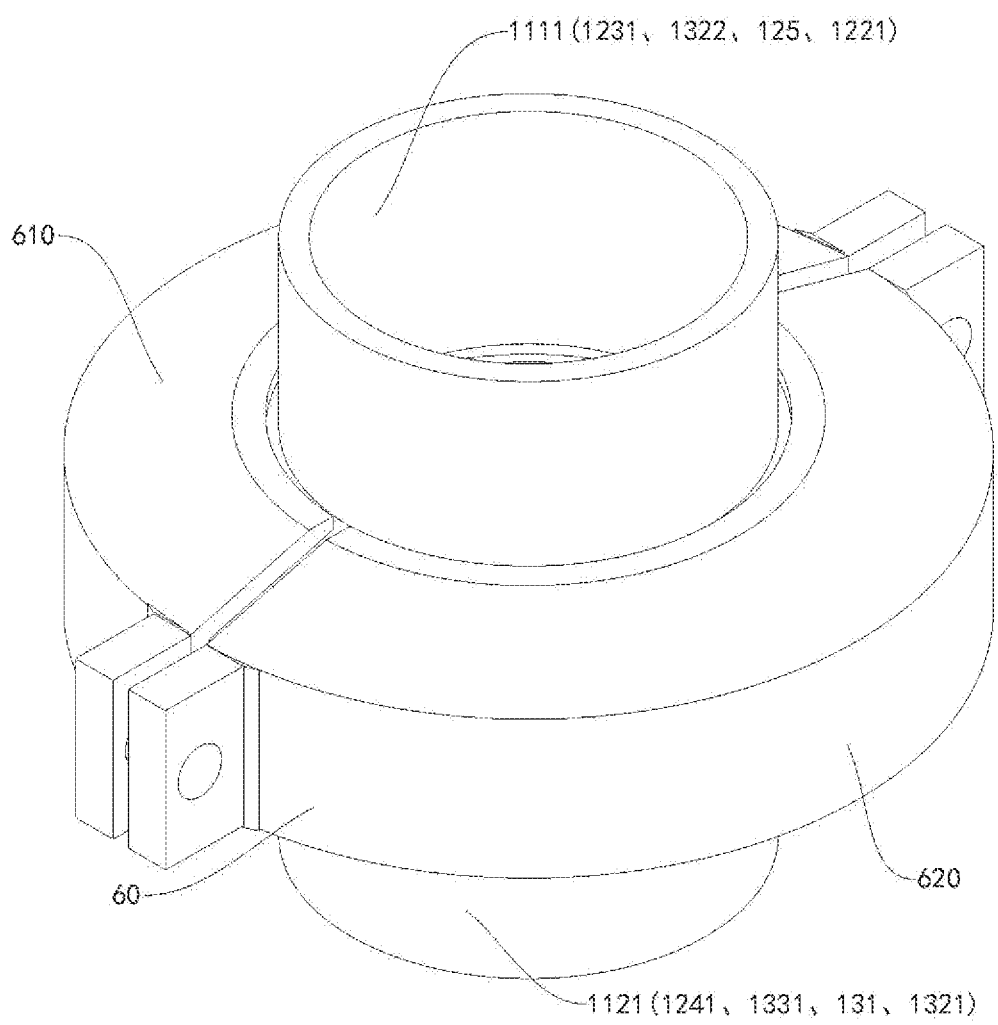
FIG. 3 is a partial schematic structural diagram of the feeding system according to an embodiment of the present invention.
Figure 4:
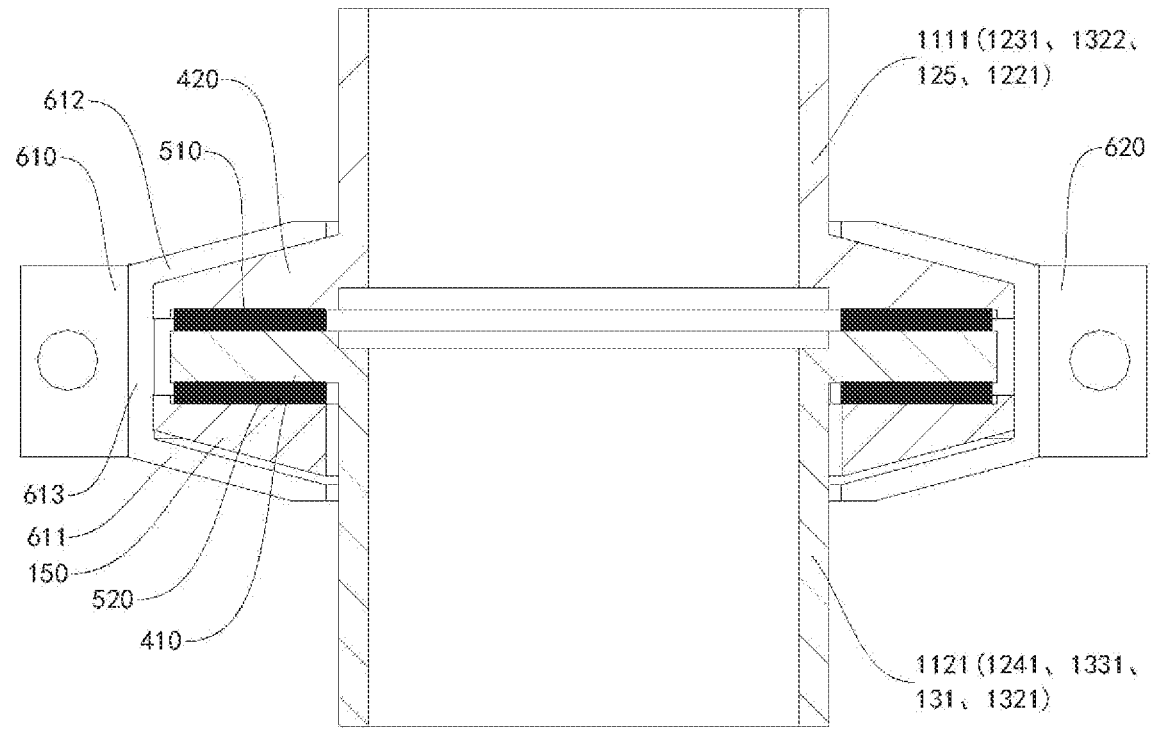
FIG. 4 is a partial schematic structural diagram of the feeding system according to an embodiment of the present invention.

As shown in FIGS. 3 and 4, in an embodiment of the present invention, the first end 1121 of the second connecting subsection 112 is provided with a first flange 410, the second end 1111 of the first connecting subsection 111 is provided with a second flange 420, and a first gasket 510 is arranged between the first flange 410 and the second flange 420. The connecting pipe 10 further comprises a lock cap 60 sleeved on the first flange 410 and the second flange 420, and a second gasket 520 is arranged between the lock cap 60 and the first flange 410. Thus the lock cap 60 can abut against (press) the second flange 420 and the second gasket 520, the first flange 410 and the second flange 420 can abut against the first gasket 510, and the first flange 410 can also abut against the second gasket 520.

The lock cap 60 comprises a first sub-cap 610 and a second sub-cap 620, which are connected with each other by fasteners (not shown in the figures). Thus, the pre-tightening force of the lock cap 60 can be adjusted by the fasteners, so that the friction force between any two of the lock cap 60, the first flange 410, the second flange 420, the first gasket 510 and the second gasket 520 that abut against each other can be adjusted. The fasteners may be bolts.

As shown in FIGS. 3 and 4, in a specific example of the present invention, each of the first sub-cap 610 and the second sub-cap 620 comprises a first pressing portion 611, a second pressing portion 612 and a connecting portion 613. The first pressing portion 611 abuts against (presses) the second gasket 520 so as to press the second gasket 520 on the first flange 410, which is to say, the first pressing portion 611 and the first flange 410 sandwich the second gasket 520. The second pressing portion 612 abuts against the second flange 420 so that the first flange 410 and the second flange 420 sandwich the first gasket 510. The connecting portion 613 is connected with each of the first pressing portion 611 and the second pressing portion 612, and may be located at the outer side of the first flange 410 and the second flange 420, which is to say, the first flange 410 and the second flange 420 are located between the first connecting subsection 111 and the connecting portion 613 in the radial direction of the first connecting subsection 111.

The connecting pipe 10 may further comprise a pressing ring 150, the lock cap 60 (the first pressing portion 611) may abut against the pressing ring 150, and the pressing ring 150 may abut against the second gasket 520 so as to press the second gasket 520 on the first flange 410, which is to say, the pressing ring 150 and the first flange 410 sandwich the second gasket 520.

Preferably the second connecting subsection 112 is an elbow. More preferably the second connecting subsection 112 is a 90-degree elbow.

As shown in FIGS. 1 and 2, in an example of the present invention, the telescopic section 120 comprises a first subsection 121 and a second subsection 122. The first subsection 121 is arranged horizontally and the second subsection 122 is arranged horizontally, which is to say, both the first subsection 121 and the second subsection 122 may extend in the horizontal direction. The first end of the first subsection 121 is connected with the second end of the first connecting section 110, and the second end of the second subsection 122 is connected with the first end of the second connecting section 130. The first end of the second subsection 122 is rotatably connected with the second end of the first subsection 121 with respect to the second end of the first subsection 121, and the rotation axis of the first end of the second subsection 122 extends in the vertical direction.

Thus at least one of the first subsection 121 and the second subsection 122 can rotate around the rotation axis of the first end of the second subsection 122, so that the telescopic section 120 can be telescoped more easily and conveniently.

As shown in FIGS. 1 and 2, the telescopic section 120 further comprises a third connecting subsection 123 and a fourth connecting subsection 124, wherein the first end of the third connecting subsection 123 is connected with the second end of the first subsection 121, and the second end of the fourth connecting subsection 124 is connected with the first end of the second subsection 122.

The second end 1231 of the third connecting subsection 123 is arranged vertically, and the first end 1241 of the fourth connecting subsection 124 is arranged vertically. That is to say, the second end 1231 of the third connecting subsection 123 may extend in the vertical direction, and the first end 1241 of the fourth connecting subsection 124 may extend in the vertical direction. The first end 1241 of the fourth connecting subsection 124 is rotatably connected with the second end 1231 of the third connecting subsection 123 with respect to the second end 1231 of the third connecting subsection 123, and the rotation axis of the first end 1241 of the fourth connecting subsection 124 extends in the vertical direction.

As shown in FIGS. 3 and 4, the first end 1241 of the fourth connecting subsection 124 is provided with a first flange 410, the second end 1231 of the third connecting subsection 123 is provided with a second flange 420, and a first gasket 510 is arranged between the first flange 410 and the second flange 420. The connecting pipe 10 further comprises a lock cap 60 sleeved on the first flange 410 and the second flange 420, and a second gasket 520 is arranged between the lock cap 60 and at least one of the first flange 410 and the second flange 420.

Thus, the lock cap 60 can abut against the second gasket 520, the first flange 410 and the second flange 420 can abut against the first gasket 510, and the first flange 410 can also abut against the second gasket 520. In the case that the second gasket 520 is not provided between the lock cap 60 and the second flange 420, the lock cap 60 can directly abut against the second flange 420.

The lock cap 60 comprises a first sub-cap 610 and a second sub-cap 620, which are connected with each other by fasteners (not shown in the figures). Thus, the pre-tightening force of the lock cap 60 can be adjusted by the fasteners, so that the friction force between any two of the lock cap 60, the first flange 410, the second flange 420, the first gasket 510 and the second gasket 520 that abut against each other can be adjusted.

As shown in FIGS. 3 and 4, in a specific example of the present invention, each of the first sub-cap 610 and the second sub-cap 620 comprises a first pressing portion 611, a second pressing portion 612 and a connecting portion 613. The first pressing portion 611 abuts against (presses) the second gasket 520 so as to press the second gasket 520 on the first flange 410, which is to say, the first pressing portion 611 and the first flange 410 sandwich the second gasket 520. The second pressing portion 612 abuts against the second flange 420 so that the first flange 410 and the second flange 420 sandwich the first gasket 510. The connecting portion 613 is connected with each of the first pressing portion 611 and the second pressing portion 612, and may be located at the outer side the first flange 410 and the second flange 420, which is to say, the first flange 410 and the second flange 420 are located between the first end 1241 of the fourth connecting subsection 124 (the second end 1231 of the third connecting subsection 123) and the connecting portion 613 in the radial direction of the first end 1241 of the fourth connecting subsection 124 (the radial direction of the second end 1231 of the third connecting subsection 123).

The connecting pipe 10 may further comprise a pressing ring 150, the lock cap 60 (the first pressing portion 611) may abut against the pressing ring 150, and the pressing ring 150 may abut against the second gasket 520 so as to press the second gasket 520 on the first flange 410, which is to say, the pressing ring 150 and the first flange 410 sandwich the second gasket 520.

Preferably each of the third connecting subsection 123 and the fourth connecting subsection 124 is an elbow, more preferably each of the third connecting subsection 123 and the fourth connecting subsection 124 is a 90-degree elbow.

In some examples of the present invention, the second connecting section 130 is arranged rotatably, and the rotation axis of the second connecting section 130 extends in the horizontal direction. Thus, the second end 140 of the connecting pipe 10 (the second end 134 of the second connecting section 130) can be moved up and down by rotating the second connecting section 130 around the rotation axis extending in the horizontal direction, wherein the up-down (vertical) direction is indicated by the arrow A in FIGS. 1 and 5.

When the second end 140 of the connecting pipe 10 moves from the first connection position to the second connection position or from the second connection position to the first connection position, the second end 140 of the connecting pipe 10 may be separated from the air outlet 312 of the blower 30 first, and then the second connecting section 130 may be rotated around the rotation axis extending in the horizontal direction to move the second end 140 of the connecting pipe 10 upward.

Next, the second end 140 of the connecting pipe 10 is moved toward the air outlet 312 of another blower 30. When the second end 140 of the connecting pipe 10 is adjacent to the air outlet 312 of said another blower 30, the second connecting section 130 may be rotated about a rotation axis extending in the horizontal direction so as to move the second end 140 of the connecting pipe 10 downward. Finally, the second end 140 of the connecting pipe 10 is connected to the air outlet 312 of said another blower 30.

By rotating the second connecting section 130 around a rotation axis extending in the horizontal direction, it is possible to prevent the material tank 20 and the blower 30 from interfering with the second end 140 of the connecting pipe 10 when moving the second end 140 of the connecting pipe 10, so that the second end 140 of the connecting pipe 10 can be moved more conveniently and easily.

Specifically, the first end 131 of the second connecting section 130 is rotatably connected with the second end 125 of the telescopic section 120, and the rotation axis of the first end 131 of the second connecting section 130 extends in the horizontal direction. Thus, the structure of the connecting pipe 10 and the feeding system 1 is more reasonable.

As shown in FIGS. 1 and 2, the second connecting section 130 comprises a fifth connecting subsection 132 and a sixth connecting subsection 133, wherein the first end 1321 of the fifth connecting subsection 132 is connected with the second end 125 of the telescopic section 120, and the second end 1332 of the sixth connecting subsection 133 is movably arranged between the first connection position and the second connection position. At the first connection position, the second end 1332 of the sixth connecting subsection 133 is connected with the air outlet 312 of one of the plurality of blowers 30; at the second connection position, the second end 1332 of the sixth connecting subsection 133 is connected with the air outlet 312 of another one of the plurality of blowers 30.

The second end 1322 of the fifth connecting subsection 132 is arranged vertically, and the first end 1331 of the sixth connecting subsection 133 is arranged vertically, which is to say, the second end 1322 of the fifth connecting subsection 132 may extend in the vertical direction, and the first end 1331 of the sixth connecting subsection 133 may extend in the vertical direction. The first end 1331 of the sixth connecting subsection 133 is rotatably connected with the second end 1322 of the fifth connecting subsection 132, and the rotation axis of the first end 1331 of the sixth connecting subsection 133 extends in the vertical direction.

When the second end 1332 of the sixth connecting subsection 133 moves from the first connection position to the second connection position or from the second connection position to the first connection position, the second end 1332 of the sixth connecting subsection 133 may be separated from the air outlet 312 of the blower 30 first, and then the second end 1332 of the sixth connecting subsection 133 may be rotated around a rotating axis extending in the vertical direction, so as to prevent the second end 1332 of the sixth connecting subsection 133 from colliding with the blower 30 when the second connecting section 130 is rotated.

When the second end 1332 of the sixth connecting subsection 133 is adjacent to the air outlet 312 of another blower 30, the second connecting section 130 may be rotated first so that the second end 140 of the connecting pipe 10 moves downward, and then the second end 1332 of the sixth connecting subsection 133 may be rotated around a rotation axis extending in the vertical direction so as to accurately adjust the position of the second end 1332 of the sixth connecting subsection 133, thus the second end 1332 of the sixth connecting subsection 133 can be connected to the air outlet 312 of said another blower 30 more conveniently and easily.

As shown in FIGS. 3 and 4, the first end 1331 of the sixth connecting subsection 133 is provided with a first flange 410, the second end 1322 of the fifth connecting subsection 132 is provided with a second flange 420, and a first gasket 510 is arranged between the first flange 410 and the second flange 420. The connecting pipe 10 further comprises a lock cap 60 sleeved on the first flange 410 and the second flange 420, and a second gasket 520 is arranged between the lock cap 60 and the first flange 410. Thus, the lock cap 60 can abut against (press) the second flange 420 and the second gasket 520, the first flange 410 and the second flange 420 can abut against the first gasket 510, and the first flange 410 can also abut against the second gasket 520.

The lock cap 60 comprises a first sub-cap 610 and a second sub-cap 620, which are connected with each other by fasteners (not shown in the figures). Thus, the pre-tightening force of the lock cap 60 can be adjusted by the fasteners, so that the friction force between any two of the lock cap 60, the first flange 410, the second flange 420, the first gasket 510 and the second gasket 520 that abut against each other can be adjusted.

As shown in FIGS. 3 and 4, in a specific example of the present invention, each of the first sub-cap 610 and the second sub-cap 620 comprises a first pressing portion 611, a second pressing portion 612 and a connecting portion 613. The first pressing portion 611 abuts against (presses) the second gasket 520 so as to press the second gasket 520 on the first flange 410, which is to say, the first pressing portion 611 and the first flange 410 sandwich the second gasket 520. The second pressing portion 612 abuts against the second flange 420 so that the first flange 410 and the second flange 420 sandwich the first gasket 510. The connecting portion 613 is connected with each of the first pressing portion 611 and the second pressing portion 612, and may be located at the outer side the first flange 410 and the second flange 420, which is to say, the first flange 410 and the second flange 420 are located between the first end 1331 of the sixth connecting subsection 133 (the second end 1322 of the fifth connecting subsection 132) and the connecting portion 613 in the radial direction of the first end 1331 of the sixth connecting subsection 133 (the radial direction of the second end 1322 of the fifth connecting subsection 132).

The connecting pipe 10 may further comprise a pressing ring 150, the lock cap 60 (the first pressing portion 611) may abut against the pressing ring 150, and the pressing ring 150 may abut against the second gasket 520 so as to press the second gasket 520 on the first flange 410, which is to say, the pressing ring 150 and the first flange 410 sandwich the second gasket 520.

Preferably each of the fifth connecting subsection 132 and the sixth connecting subsection 133 is an elbow. More preferably each of the fifth connecting subsection 132 and the sixth connecting subsection 133 is a 90-degree elbow.

As shown in FIGS. 3 and 4, the first end 131 of the second connecting section 130 (the first end 1321 of the fifth connecting subsection 132) is provided with a first flange 410, the second end 125 of the telescopic section 120 (the second end 1221 of the second subsection 122) is provided with a second flange 420, and a first gasket 510 is arranged between the first flange 410 and the second flange 420. The connecting pipe 10 further comprises a lock cap 60 sleeved on the first flange 410 and the second flange 420, and a second gasket 520 is arranged between the lock cap 60 and the first flange 410. Thus, the lock cap 60 can abut against (press) the second flange 420 and the second gasket 520, the first flange 410 and the second flange 420 can abut against the first gasket 510, and the first flange 410 can also abut against the second gasket 520.

The lock cap 60 comprises a first sub-cap 610 and a second sub-cap 620, which are connected with each other by fasteners (not shown in the figures). Thus, the pre-tightening force of the lock cap 60 can be adjusted by the fasteners, so that the friction force between any two of the lock cap 60, the first flange 410, the second flange 420, the first gasket 510 and the second gasket 520 that abut against each other can be adjusted.

As shown in FIGS. 3 and 4, in a specific example of the present invention, each of the first sub-cap 610 and the second sub-cap 620 comprises a first pressing portion 611, a second pressing portion 612 and a connecting portion 613. The first pressing portion 611 abuts against (presses) the second gasket 520 so as to press the second gasket 520 on the first flange 410, which is to say, the first pressing portion 611 and the first flange 410 sandwich the second gasket 520. The second pressing portion 612 abuts against the second flange 420 so that the first flange 410 and the second flange 420 sandwich the first gasket 510. The connecting portion 613 is connected with each of the first pressing portion 611 and the second pressing portion 612, and may be located at the outer side the first flange 410 and the second flange 420, which is to say, the first flange 410 and the second flange 420 are located between the first end 131 of the second connecting section 130 (the second end 125 of the telescopic section 120) and the connecting portion 613 in the radial direction of the first end 131 of the second connecting section 130 (the radial direction of the second end 125 of the telescopic section 120).

The connecting pipe 10 may further comprise a pressing ring 150, the lock cap 60 (the first pressing portion 611) may abut against the pressing ring 150, and the pressing ring 150 may abut against the second gasket 520 so as to press the second gasket 520 on the first flange 410, which is to say, the pressing ring 150 and the first flange 410 sandwich the second gasket 520.

Figure 5:
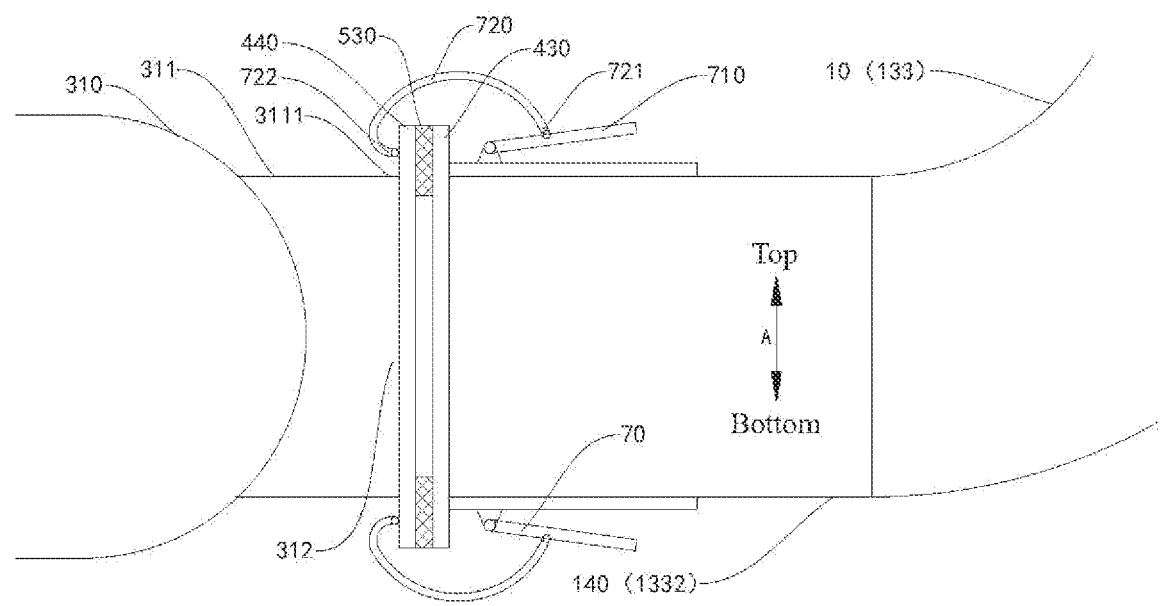
FIG. 5 is a partial schematic structural diagram of the feeding system according to an embodiment of the present invention.

As shown in FIGS. 1 and 5, the second end 140 of the connecting pipe 10 (the second end 1332 of the sixth connecting subsection 133) is arranged horizontally, and the volute casing 310 of each blower 30 has an air discharge portion 311 arranged horizontally, which is to say, the second end 140 of the connecting pipe 10 may extend in the horizontal direction, and the air discharge portion 311 may extend in the horizontal direction. The free end 3111 of the air discharge portion 311 defines the air outlet 312 of the blower 30. At the first connection position, the second end 140 of the connecting pipe 10 is connected with the free end 3111 of one of the plurality of blowers 30; at the second connection position, the second end 140 of the connecting pipe 10 is connected with the free end 3111 of another one of the plurality of blowers 30.

As shown in FIGS. 1 and 5, the second end 140 of the connecting pipe 10 is provided with a third flange 430, and the air discharge portion 311 is provided with a fourth flange 440. The connecting pipe 10 further comprises a connecting shackle 70, which comprises a manipulating portion 710 and a hook portion 720. The manipulating portion 710 is hinged to the second end 140 of the connecting pipe 10, and the first end 721 of the hook portion 720 is connected with the manipulating portion 710.

When the second end 140 of the connecting pipe 10 is at the first connection position or the second connection position, the third flange 430 is fitted with the fourth flange 440 on the corresponding blower 30 (directly contact or indirect contact via the third gasket 530), and the second end 722 of the hook portion 720 hooks the fourth flange 440, so as to press the fourth flange 440 on the third flange 430.

A plurality of connecting shackles 70 may be provided, and the plurality of connecting shackles 70 may be arranged at an interval in the circumferential direction of the second end 140 of the connecting pipe 10. Next, the technical scheme of the present application will be further described in an example of an upper connecting shackle 70 in FIG. 5.

The lower end of the manipulating portion 710 may be hinged to the second end 140 of the connecting pipe 10. When the manipulating portion 710 rotates clockwise, the second end 722 of the hook portion 720 moves toward the third flange 430, so as to press the fourth flange 440 on the third flange 430. When the manipulating portion 710 rotates counterclockwise, the second end 722 of the hook portion 720 moves away from the third flange 430, so that the third flange 430 can be separated from the fourth flange 440.

The third gasket 530 between the third flange 430 and the fourth flange 440 may be made of rubber, so that the third flange 430 and the fourth flange 440 can be connected together more tightly, and thus leakage of dust-containing gas between the third flange 430 and the fourth flange 440 can be prevented.

As shown in FIG. 2, the feeding system 1 may further comprises a first supporting frame 810 and a second supporting frame 820. The connecting pipe 10 may be retracted when no powdered raw material is loaded into the material tanks 20. The first subsection 121 may be supported on the first supporting frame 810, and the second subsection 122 may be supported on the second supporting frame 820.

The present invention further provides a glass production apparatus. The glass production apparatus according to an embodiment of the present invention comprises a kiln (not shown in the figures), a mixing tank 20, and the feeding system 1 according to the above embodiment of the present invention. The feed inlet of the mixing tank 20 is in communication with the discharge outlet of each tank 20 of the feeding system 1, and the feed inlet of the kiln is in communication with the discharge outlet of the mixing tank 20.

Therefore, the glass production apparatus according to the embodiment of the present invention has the advantages of simple structure and zero dust leakage, etc.

In the description of the present invention, it should be understood that the orientation or position relations indicated by terms "center", "longitudinal", "transverse", "length", "width", "thickness", "above", "below", "front", "behind", "left", "right", "vertical", "horizontal", "top", "bottom", "inside", "outside", "clockwise", "counter-clockwise", "axial", "radial", or "circumferential", etc., are based on the orientation or position relations indicated in the accompanying drawings. They are used only to ease and simplify the description of the present invention, rather than indicating or implying that the involved device or component must have a specific orientation or must be constructed and operated in a specific orientation. Therefore, the use of these terms shall not be deemed as constituting any limitation to the present invention.

In addition, the terms "first" and "second" are used only for description purpose, and shall not be interpreted as indicating or implying relative importance or implicitly indicating the quantity of the indicated technical feature. Hence, a feature confined by "first" or "second" may explicitly or implicitly comprise at least one such feature. In the description of the present invention, "a plurality of" or "multiple" means at least two, such as two or more, etc., unless otherwise specified explicitly.

In the present invention, unless otherwise specified and defined explicitly, the terms "install", "link", "connect", "fix", etc. shall be interpreted in their general meaning. For example, the connection may be fixed connection, detachable connection, or integral connection; may be mechanical connection or electrical connection or in communication with each other; may be direct connection or indirect connection via an intermediate medium, or internal communication or interactive relation between two elements unless otherwise defined explicitly. Those having ordinary skills in the art may interpret the specific meanings of the terms in the present invention in their context.

In the present invention, unless otherwise specified and defined explicitly, a first feature "above" or "below" a second feature may represent that the first feature and the second feature directly contact with each other or the first feature and the second feature contact with each other indirectly via an intermediate medium. In addition, a first feature "above" or "over" a second feature may represent that the first feature is right above or diagonally above the second feature, or may only represent that the elevation of the first feature is higher than that of the second feature. A first feature being "below" or "under" a second feature may represent that the first feature is right below or diagonally below the second feature, or may only represent that the elevation of the first feature is lower than that of the second feature.

In the description of the present invention, the expressions of reference terms "an embodiment", "some embodiments", "an example", "a specific example", or "some examples" mean that the specific features, structures, materials or characteristics described in those embodiments or examples are included in at least one embodiment or example of the present invention. In this document, the exemplary expression of the above terms may not necessarily refer to the same embodiment or example. Moreover, the specific features, structures, materials, or characteristics described can be combined appropriately in any one or more embodiments or examples. Furthermore, those skilled in the art may combine or assemble different embodiments or examples and features in different embodiments or examples described herein, provided that there is no conflict among them.

While the present invention is illustrated and described above in embodiments, it should be understood that the embodiments are exemplary only and shall not be deemed as constituting any limitation to the present invention. Those skilled in the art can made variations, modifications, and replacements to the embodiments within the scope of the present invention.

The invention claimed is:

1. A feeding system, comprising:
   a plurality of material tanks, each of which has an air outlet;
   a plurality of blowers, having air inlets in communication with air outlets of the material tanks in one-to-one correspondence;
   a dust remover, having an air inlet; and
   a connecting pipe, having a first end in communication with the air inlet of the dust remover and a second end movably arranged between a first connection position and a second connection position, wherein:
      at the first connection position, the second end is connected with the air outlet of a first blower of the plurality of blowers; and
      at the second connection position, the second end is connected with the air outlet of a second blower of the plurality of blowers.

2. The feeding system according to claim 1, wherein the connecting pipe comprises:
   a first connecting section, having a first end in communication with the air inlet of the dust remover;
   a telescopic section having a first end connected with a second end of the first connecting section; and
   a second connecting section having a first end connected with a second end of the telescopic section and a second end that is movable between the first connection position and the second connection position, wherein, at the first connection position, the second end of the second connecting section is connected with the air outlet of the first blower, and at the second connection position, the second end of the second connecting section is connected with the air outlet of the second blower.

3. The feeding system according to claim 2, wherein the first connecting section comprises:
   a first connecting subsection arranged vertically, having a first end connected with the air inlet of the dust remover; and
   a second connecting subsection, having a second end connected with the first end of the telescopic section and a first end vertically arranged and rotatably connected with a second end of the first connecting subsection, wherein a rotation axis of the first end of the second connecting subsection is vertical.

4. The feeding system according to claim 3, wherein the second connecting subsection is an elbow.

5. The feeding system according to claim 4, wherein the second connecting subsection is a 90-degree elbow.

6. The feeding system according to claim 3, wherein:
   the first end of the second connecting subsection is provided with a first flange;
   the second end of the first connecting subsection is provided with a second flange, a first gasket being provided between the first flange and the second flange;
   the connecting pipe further comprises a lock cap sleeved on the first flange and the second flange, a second gasket being provided between the lock cap and the first flange, wherein the lock cap comprises a first sub-cap and a second sub-cap, which are connected with each other by fasteners.

7. The feeding system according to claim 2, wherein the telescopic section comprises:
   a first subsection arranged horizontally, having a first end connected with the second end of the first connecting section; and
   a second subsection arranged horizontally, having a second end connected with the first end of the second connecting section the first end of the telescopic section being rotatable with respect to the second end of the first subsection about a vertical rotation axis.

8. The feeding system according to claim 7, wherein the telescopic section further comprises:
   a third connecting subsection having a first end connected with the second end of the first subsection and a vertical second end; and
   a fourth connecting subsection having a vertical first end that is rotatably connected with the second end of the third connecting subsection and a second end connected with the first end of the second connecting subsection, wherein a rotation axis of the first end of the fourth connecting subsection is vertical.

9. The feeding system according to claim 8, wherein each of the third connecting subsection and the fourth connecting subsection is a 90-degree elbow.

10. The feeding system according to claim 8, wherein:
the first end of the fourth connecting subsection is provided with a first flange;
the second end of the third connecting subsection is provided with a second flange;
a first gasket is provided between the first flange and the second flange;
the connecting pipe further comprises a lock cap sleeved on the first flange and the second flange; and
a second gasket is provided between the lock cap and at least one of the first flange and the second flange, wherein the lock cap comprises a first sub-cap and a second sub-cap, which are connected with each other by fasteners.

11. The feeding system according to claim 2, wherein the second connecting section is rotatable about a horizontal rotation axis.

12. The feeding system according to claim 11, wherein the first end of the second connecting section is rotatably connected with the second end of the telescopic section, a rotation axis of the first end of the second connecting section being horizontal.

13. The feeding system according to claim 11, wherein:
the first end of the second connecting section is provided with a first flange;
the second end of the telescopic section is provided with a second flange;
a first gasket is provided between the first flange and the second flange;
the connecting pipe further comprises a lock cap sleeved on the first flange and the second flange; and
a second gasket is provided between the lock cap and the first flange, wherein the lock cap comprises a first sub-cap and a second sub-cap, which are connected with each other by fasteners.

14. The feeding system according to claim 2, wherein the second connecting section comprises:
a fifth connecting subsection having a first end connected with the second end of the telescopic section and a vertical second end; and
a sixth connecting subsection having a vertical first end that is rotatably connected with the second end of the fifth connecting subsection and a second end that is movable between the first connection position and the second connection position, wherein a rotation axis of the first end of the sixth connecting subsection is vertical.

15. The feeding system according to claim 14, wherein each of the fifth connecting subsection and the sixth connecting subsection is a 90-degree elbow.

16. The feeding system according to claim 14, wherein:
the first end of the sixth connecting subsection is provided with a first flange;
the second end of the fifth connecting subsection is provided with a second flange;
a first gasket is provided between the first flange and the second flange;
the connecting pipe further comprises a lock cap sleeved on the first flange and the second flange; and
a second gasket is provided between the lock cap and the first flange, wherein the lock cap comprises a first sub-cap and a second sub-cap, which are connected with each other by fasteners.

17. The feeding system according to claim 1, wherein the second end of the connecting pipe is horizontal, and a volute casing of each of the plurality of blowers has a horizontal air discharge portion which has a free end defining the air outlet of the blower, wherein:
at the first connection position, the second end is connected with the free end of the first blower; and
at the second connection position, the second end is connected with the free end of the second blower.

18. The feeding system according to claim 17, wherein the second end of the connecting pipe is provided with a third flange, the air discharge portion is provided with a fourth flange, and the connecting pipe further comprises a connecting shackle, which comprises:
a manipulating portion hinged to the second end of the connecting pipe; and
a hook portion having a first end connected with the manipulating portion, wherein, when the second end of the connecting pipe is at the first connection position or the second connection position, the third flange is fitted with the fourth flange on the corresponding first or second blower, and the second end of the hook portion hooks the fourth flange, so as to press the fourth flange onto the third flange.

19. A glass production apparatus, comprising:
a feeding system according to claim 1;
a mixing tank having a feed inlet in communication with a discharge outlet of each of the material tanks of the feeding system; and
a kiln, having a feed inlet in communication with a discharge outlet of the mixing tank.

* * * * *